(12) United States Patent
Kulbat

(10) Patent No.: US 12,008,168 B2
(45) Date of Patent: Jun. 11, 2024

(54) METHOD FOR OPERATING A MOBILE TERMINAL USING A GESTURE RECOGNITION AND CONTROL DEVICE, GESTURE RECOGNITION AND CONTROL DEVICE, MOTOR VEHICLE, AND AN OUTPUT APPARATUS THAT CAN BE WORN ON THE HEAD

(71) Applicant: AUDI AG, Ingolstadt (DE)

(72) Inventor: Norbert Kulbat, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 39 days.

(21) Appl. No.: 17/627,304

(22) PCT Filed: Jul. 1, 2020

(86) PCT No.: PCT/EP2020/068456
§ 371 (c)(1),
(2) Date: Jan. 14, 2022

(87) PCT Pub. No.: WO2021/008871
PCT Pub. Date: Jan. 21, 2021

(65) Prior Publication Data
US 2022/0244789 A1   Aug. 4, 2022

(30) Foreign Application Priority Data
Jul. 15, 2019   (DE) ...................... 10 2019 210 383.9

(51) Int. Cl.
*G06F 3/01* (2006.01)
*B60K 35/00* (2006.01)
(Continued)

(52) U.S. Cl.
CPC .............. *G06F 3/017* (2013.01); *B60K 35/00* (2013.01); *B60W 50/10* (2013.01);
(Continued)

(58) Field of Classification Search
CPC ................... B60K 35/00; B60K 37/06; B60K 2370/1464; B60K 2370/1468;
(Continued)

(56) References Cited

U.S. PATENT DOCUMENTS

2014/0225918 A1   8/2014  Mittal et al.
2015/0187357 A1*  7/2015  Xia .......................... G06F 3/005
                                                            704/275
(Continued)

FOREIGN PATENT DOCUMENTS

CN           109781136 A      5/2019
DE      10 2016 207 530 A1   11/2017
(Continued)

OTHER PUBLICATIONS

International Preliminary Report on Patentability dated Jan. 18, 2022 in International Application No. PCT/EP2020/068456 (7 pages).
(Continued)

*Primary Examiner* — Nelson M Rosario
(74) *Attorney, Agent, or Firm* — STAAS & HALSEY LLP

(57) ABSTRACT

A gesture recognition and control device recognizes a mobile terminal and ascertains a current graphical user interface generated by a display device of the mobile terminal. The gesture recognition and control device provides an output signal describing, as display content, the graphical user interface generated by the display device of the mobile terminal, and transmits the output signal to an output apparatus that can be worn on the head for outputting the display content in a predefined output region in the interior of the motor vehicle as part of augmented reality or virtual reality output by the output apparatus. During the process of outputting the display content, the gesture recognition and
(Continued)

control device recognizes a spatial gesture of the user, generates a remote control signal for triggering an operating function of the mobile terminal, and transmits the remote control signal to a control device of the recognized mobile terminal.

15 Claims, 4 Drawing Sheets

(51) Int. Cl.
| | | |
|---|---|---|
| *B60W 50/10* | (2012.01) | |
| *B60W 60/00* | (2020.01) | |
| *G06F 3/04815* | (2022.01) | |
| *G06F 3/0482* | (2013.01) | |
| *G06F 3/0484* | (2022.01) | |
| *G06T 3/40* | (2006.01) | |
| *G06V 40/20* | (2022.01) | |
| *B60K 35/10* | (2024.01) | |
| *B60K 35/22* | (2024.01) | |
| *B60K 35/28* | (2024.01) | |

(52) U.S. Cl.
CPC .......... *B60W 60/001* (2020.02); *G06F 3/011* (2013.01); *G06F 3/04815* (2013.01); *G06F 3/0482* (2013.01); *G06F 3/0484* (2013.01); *G06T 3/40* (2013.01); *G06V 40/20* (2022.01); *B60K 35/10* (2024.01); *B60K 35/22* (2024.01); *B60K 35/28* (2024.01); *B60K 2360/1468* (2024.01); *B60K 2360/175* (2024.01); *B60W 2420/403* (2013.01); *B60W 2540/00* (2013.01); *G06T 2200/24* (2013.01)

(58) Field of Classification Search
CPC ........ B60K 2370/152; B60K 2370/175; B60K 2370/177; B60K 2370/563; B60K 2370/569; B60K 2370/577; B60W 50/10; B60W 60/001; B60W 2420/42; B60W 2540/00; G02B 27/017; G02B 2027/014; G02B 2027/0178; G06F 3/011; G06F 3/017; G06F 3/04815; G06F 3/04817; G06F 3/0482; G06F 3/0484; G06F 3/04883; G06T 3/40; G06T 2200/24; G06V 40/20
See application file for complete search history.

(56) References Cited

U.S. PATENT DOCUMENTS

2015/0309629 A1* 10/2015 Amariutei ............... G06F 3/017
345/173
2019/0391724 A1* 12/2019 Holz ..................... G06F 3/0304

FOREIGN PATENT DOCUMENTS

| | | |
|---|---|---|
| DE | 10 2016 225 268 A1 | 6/2018 |
| DE | 10 2017 211 521 A1 | 1/2019 |
| DE | 10 2019 210 383.9 | 7/2019 |
| EP | 2 889 718 A1 | 7/2015 |
| EP | 3 079 041 A1 | 10/2016 |
| EP | 3 457 254 A1 | 3/2019 |
| WO | PCT/EP2020/068456 | 4/2020 |

OTHER PUBLICATIONS

Chinese Office Action issued in counterpart Chinese Application No. 202080044013.2 dated Jan. 17, 2024.

* cited by examiner

METHOD FOR OPERATING A MOBILE TERMINAL USING A GESTURE RECOGNITION AND CONTROL DEVICE, GESTURE RECOGNITION AND CONTROL DEVICE, MOTOR VEHICLE, AND AN OUTPUT APPARATUS THAT CAN BE WORN ON THE HEAD

CROSS REFERENCE TO RELATED APPLICATIONS

This application is a U.S. national stage of International Application No. PCT/EP2020/068456, filed on Jul. 1, 2020. The International Application claims the priority benefit of German Application No. 10 2019 210 383.9 filed on Jul. 15, 2019. Both International Application No. PCT/EP2020/068456 and German Application No. 10 2019 210 383.9 are incorporated by reference herein in their entirety.

BACKGROUND

Described herein is a method for operating a mobile terminal, for example a smartphone or tablet PC, wherein the method is carried out by a gesture recognition and control device. A gesture recognition and control device should be understood to mean a device, a device component or a device group configured to recognize an operating gesture, and additionally configured to receive and to evaluate signals, and also to generate a control signal. Optionally, the gesture recognition and control device can also be configured for detecting the operating gesture, for example by use of a camera.

As an alternative to operation of vehicle systems by way of a human-machine interface ("HMI") and as an alternative to operation by a driver, for example a passenger at the back in modern motor vehicles has available a mobile terminal, for example a tablet PC, on which for example vehicle functions such as a current speed, for example, can be displayed. This is a hardware operating part which makes it possible for example to adjust vehicle functions, navigation, and media contents. This is important primarily in such vehicles in which persons are often chauffeured, for example in vehicles of a transport service.

However, such an example tablet PC now seems rather outmoded and can also only be used by one passenger. The same problem arises with the use of a mobile terminal, for example a smartphone.

German Patent Application No. 10 2016 207 530 A1 describes a system for representing a virtual vehicle interior, with one or more vehicle interior components and smartglasses configured to optically render a virtual vehicle interior for a user and to take account of the one or more vehicle interior components during the optical rendering.

European Patent Application No. 3 079 041 A1 describes a method and a system for providing a virtual reality environment for passengers of land vehicles and aircraft.

German Patent Application No. 10 2017 211 521 A1 describes a motor vehicle for conveying at least one user, including a subsystem configured to perform a physical function of the motor vehicle.

SUMMARY

One or more aspects of the disclosure relate simplifying the operation of a mobile terminal in a motor vehicle.

This may be achieved by the method described herein and the apparatuses described herein. Advantageous developments of the method and apparatuses are also described.

One or more aspects of the disclosure are based on the concept of mirroring a user interface of a mobile terminal on an output apparatus that can be worn on the head, and of implementing spatial gesture recognition for operating the mirrored user interface. In this case, a spatial gesture is understood to mean a gesture, for example an operating gesture, which does not involve having to touch a touch-sensitive surface, for example a touchscreen or a touchpad, but rather is carried out freely in space. The spatial gesture can be for example a predetermined finger posture and/or hand posture, and/or a movement of the hand.

In other words, the virtual or augmented reality ("AR") output on the smartglasses that can be worn on the head integrates an image of a user interface of the mobile terminal and mirrors this into the motor vehicle. A motor vehicle including a correspondingly configured gesture recognition and control device is compatible with all mobile terminals and output apparatuses that can be worn on the head.

As a result, not only is the operation of the mobile terminal very modern, but a user can operate the mobile terminal simultaneously while using the output apparatus that can be worn on the head for an entertainment function, for example a VR video game. The user does not have to take the output apparatus, for example smartglasses, off every time in order for example to receive a call or to look something up in a calendar of the mobile terminal. This results in comprehensive operation of the mobile terminal from the back, for example, without leaving virtual reality (VR) (or augmented reality). Even when the user is in any seated and/or recumbent position in which he/she perhaps cannot reach and pick up the mobile terminal in order for example to carry out a swipe gesture on the touchscreen of the mobile terminal, the mobile terminal is operable. In addition, a comprehensively configurable and scalable system is provided by the method described herein and the apparatuses described herein. Aspects of the disclosure are even applicable to a driver of the motor vehicle if the motor vehicle is being operated in a fully autonomous driving mode (i.e. a piloted driving mode).

In other words, remote operation is provided which can be used while for example a user at the back is occupied with an entertainment system, and is experiencing a game, for example, or for example a driver himself/herself is attending a VR meeting during autonomous travel (level 5).

Moreover, it proves to be advantageous that no software for virtual reality or augmented reality need be installed on the mobile terminal.

The method described herein for operating a mobile terminal, for example a smartphone, is carried out by a gesture recognition and control device, for example a gesture recognition and control device of a motor vehicle. The gesture recognition and control device can be embodied for example as a control chip or control device and can include for example gesture recognition software and/or for example a camera for detecting an operating gesture.

The mobile terminal, for example a mobile terminal situated in or on the motor vehicle, is recognized. The mobile terminal can be recognized by use of a Bluetooth connection, for example. The gesture recognition and control device ascertains a current graphical user interface generated by an output device of the recognized mobile terminal, the graphical user interface providing an operating option that involves an operating function of the mobile terminal being triggerable.

The gesture recognition and control device provides an output signal describing, as display content, the graphical user interface generated by the display device of the mobile terminal. A display device is understood to mean a device component for displaying an image content, for example a touch-sensitive screen. By way of example, an output signal of the mobile terminal can be forwarded to the gesture recognition and control device, and the output signal provided by the gesture recognition and control device can then be for example the output signal of the mobile terminal. Alternatively, the output signal can be provided by the gesture recognition and control device generating the output signal, wherein the generated output signal can describe an image of the graphical user interface of the mobile terminal.

The output signal provided by the gesture recognition and control device is transmitted by the latter to an output apparatus that can be worn on the head. In other words, for example, an output signal of the mobile terminal is forwarded to the output apparatus that can be worn on the head, the graphical user interface is mirrored on a display surface of the output apparatus that can be worn on the head, or a display surface of the output apparatus that can be worn on the head is synchronized with a screen of the mobile terminal.

The output apparatus that can be worn on the head is an output device for outputting augmented reality and/or virtual reality. The output apparatus that can be worn on the head can for example be embodied as smartglasses, or as some other known "head mounted display" ("HMD"), i.e. a visual output device to be worn on the head).

The transmission of the provided output signal to the output apparatus that can be worn on the head is effected for the purpose of outputting the display content as part of augmented or virtual reality provided or output by the output apparatus in a predefined output region in the interior of the motor vehicle. In other words, the display content is not displayed in the predefined output region, for example a region between the user on the back seat and a backrest of the front seat, but rather on a display surface of the output apparatus that can be worn on the head, such that upon viewing in the direction of the predefined output region the display content appears there. In other words, the display content is output on a portion of a display surface of the output apparatus that can be worn on the head, which portion lies in a viewing direction of the user toward the predefined output region.

During the process of outputting the display content, a process of recognizing a contactless operating gesture of the user depending on the provided operating option is effected. If the user interface currently provided by the mobile terminal provides for example the operating option that provides for selecting a currently open program of the mobile terminal by for example swiping over the screen, when the graphical user interface is mirrored on the output apparatus that can be worn on the head it is possible for a spatial gesture to be recognized by the gesture recognition and control device, which spatial gesture can be for example contactless swiping in space. By virtue of this recognized contactless operating gesture, i.e. the recognized spatial gesture, the selection of the program of the mobile terminal can be triggered without the screen of the mobile terminal being touched. Since the graphical user interface is furthermore mirrored from the mobile terminal to the output apparatus that can be worn on the head, the user then sees as display content the opening of the selected program, for example.

If the gesture recognition and control device includes for example a camera, for example a time-of-flight camera, the contactless operating gesture can be detected before the contactless operating gesture is recognized.

The gesture recognition and control device generates a remote control signal depending on the recognized contactless operating gesture, wherein the generated remote control signal describes triggering of the operating function of the mobile terminal that is assigned to the recognized contactless operating gesture. For example, the contactless operating gesture for triggering the operating function can be a spatial gesture that is similar or analogous to the touch gesture of the touch gesture assigned to the operating function. If the touch gesture is for example swiping on the screen of the mobile terminal from left to right, for example, the corresponding spatial gesture for triggering the operating function can be movement of the user's hand from left to right in the air.

The gesture recognition and control device transmits the generated remote control signal to a control device of the recognized mobile terminal for triggering the operating function. In this case, a control device is understood to mean a device component or for example a component group for receiving and evaluating signals, and for generating control signals. The control device of the recognized mobile terminal can be a control chip, for example.

In other words, when the graphical user interface is mirrored on the output apparatus that can be worn on the head, a contactless operating gesture is assigned to the operating function to which, in the mobile terminal, for example a touch gesture on for example a touchscreen of the mobile terminal is assigned. In other words, the graphical user interface provides the operating option that involves the operating function being triggerable via an operating gesture, for example a touch gesture, in the case of direct operation of the mobile terminal. In accordance with the method described herein, however, the operating function may be triggered indirectly via the mirrored user interface in the virtual or augmented reality via a contactless operating gesture, i.e. a spatial gesture that is recognized by the gesture recognition and control device rather than by the mobile terminal.

The advantages mentioned above are afforded.

In an example user-specific implementation, an embodiment of the method described herein can provide for the gesture recognition and control device to recognize a further contactless operating gesture, for example during the process of outputting the display content by use of the output apparatus that can be worn on the head, wherein the further contactless operating gesture can predefine positioning or placement of the display content (i.e. of an image of the mirrored user interface) in the interior of the motor vehicle. In other words, the further contactless operating gesture predefines the location or place or position in the motor vehicle at which the display content is intended to be able to be seen or to appear when the user wears the output apparatus that can be worn on the head. The gesture recognition and control device can then predefine the output region on the basis of the recognized further contactless operating gesture. In other words, a virtual location of the display content can be predefined and/or changed.

In an example embodiment of the method described herein, a further contactless operating gesture can be recognized by the gesture recognition and control device, which further contactless operating gesture can describe scaling of the display content (i.e. of an image of the mirrored user interface). In other words, the further contactless operating gesture can predefine and/or change for example a format and/or a size of the display content. The gesture recognition and control device can then carry out scaling of an image showing the display content. The scaling of the image is effected on the basis of the recognized further contactless operating gesture. The advantages that have already been described with regard to the previous embodiment are also applicable to this example embodiment.

For the placement and/or scaling of the display content, it is possible in each case optionally for the respective further contactless operating gesture to be detected by the gesture recognition and control device.

Ideally, for the scaling and/or positioning of the display content, a further, i.e. separate, user interface can be displayed by the output apparatus that can be worn on the head. The user is assisted in the scaling and positioning for this purpose. In order to realize this, the gesture recognition and control device can provide a further output signal, which can describe, as display content, a further graphical user interface, wherein the further graphical user interface can provide an operating menu for the scaling and/or positioning of the display content describing the graphical user interface generated by the display device of the mobile terminal. The further graphical user interface can thus optionally be independent of what the mobile terminal displays, and can therefore be referred to as an additional graphical user interface.

For example, the gesture recognition and control device can carry out one or more method operations of the above-described embodiments depending on activation of a fully autonomous driving mode and/or depending on a motor/engine start of the motor vehicle. For this purpose, the gesture recognition and control device can for example interrogate the current driving mode (or a future driving mode) from a driver assistance system or receive a corresponding signal from the driver assistance system; and/or the gesture recognition and control device can for example receive and evaluate a start signal from an ignition system of the motor vehicle. The mirroring of the user interface of the mobile terminal is thus displayed reliably and immediately by the output apparatus. In the fully autonomous driving mode, the advantage is additionally afforded that even a driver can wear and use the output apparatus that can be worn on the head.

The gesture recognition and control device described herein may be configured to carry out a method according to any of the embodiments described herein. The gesture recognition and control device can be embodied for example as a control device or control chip or as an application program ("App"). For example, the gesture recognition and control device can include a processor device, i.e. a component or a device component which is embodied and configured for electronic data processing, and can for example include at least one microcontroller and/or one microprocessor. Optionally, the gesture recognition and control device can include a data memory, for example a memory card or a memory chip, or some other data memory, on which for example a program code can be stored which, upon execution by the processor device, can cause the gesture recognition and control device to carry out one or more embodiments of the method described herein.

The gesture recognition and control device can for example be a gesture recognition and control device of the motor vehicle.

Optionally, the gesture recognition and control device can include one or more sensors, for example one or more cameras. Each of the advantages already described is also applicable to this example embodiment.

Also described herein is a motor vehicle including one or more embodiments of the gesture recognition and control device described above. The advantages already mentioned are also applicable to the motor vehicle described herein.

Also described herein is an output apparatus that can be worn on the head, for example smartglasses, embodied for outputting augmented reality and/or virtual reality, and including one or more embodiments of the gesture recognition and control device described herein. The advantages already mentioned are also applicable to the output apparatus described herein.

The disclosure also includes developments of the gesture recognition and control device described herein and of the motor vehicle described herein which have features such as have already been described in association with the developments of the method described herein. For this reason, the corresponding developments of the gesture recognition and control device described herein and of the motor vehicle described herein will not be described again here.

The motor vehicle described herein may be an automobile, for example a car or truck, or a passenger bus or a motorcycle.

The disclosure also encompasses the combinations of the features of the embodiments described.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
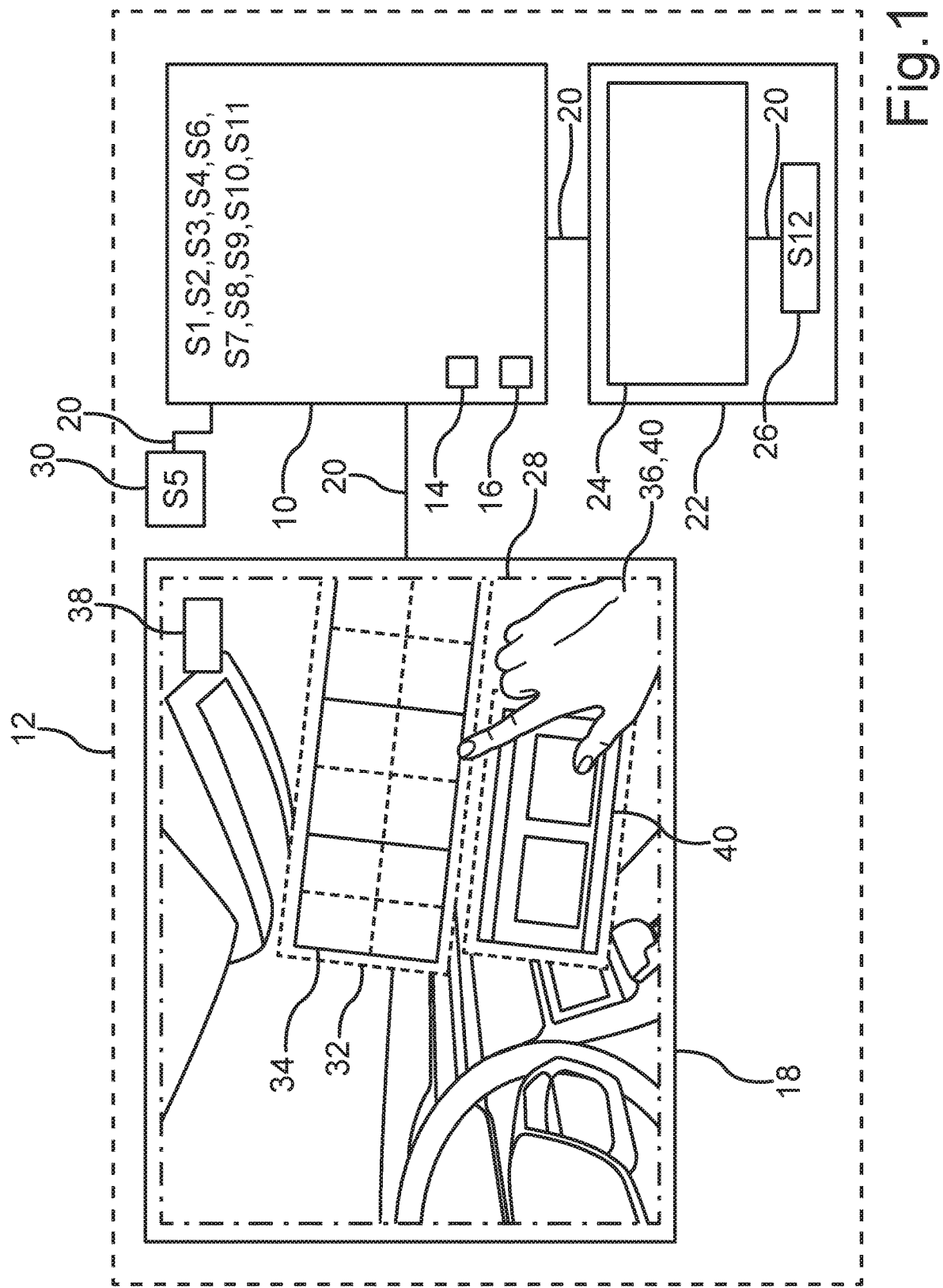
FIG. 1 is a schematic illustration concerning an example embodiment of the method described herein and of the apparatuses described herein.

Reference will now be made in detail to example embodiments which are illustrated in the accompanying drawings, wherein like reference numerals refer to like elements throughout.

The example embodiments described below are examples of the disclosure In the example embodiments, the described components of the embodiments each constitute individual features which should be considered independently of one another and which each also develop the disclosure independently of one another. Therefore, the disclosure is also intended to encompass combinations of the features of the embodiments other than the combinations presented. Furthermore, the embodiments described can also be supplemented by further features from among those already described.

In the drawings, identical reference signs in each case designate functionally identical elements.

FIG. 1 illustrates the principle of the method described herein and of the apparatuses described herein in accordance with an example embodiment.

As shown in the example in FIG. 1, a gesture recognition and control device 10 can be for example a control chip or a control device of a motor vehicle 12, which can be embodied for example as a car, for example as a car that can be operated in a piloted or fully autonomous driving mode. The gesture recognition and control device 10 may include a processor device 14 having a plurality of microprocessors, for example, and/or a data memory 16, for example a memory card or a memory chip. For example, a program code for carrying out the method can be stored on the optional data memory 16. Optionally, a driver for an operating system of the mobile terminal 22 can be stored in the data memory 16 of the gesture recognition and control device 10.

The communication with an output apparatus 18 that can be worn on the head can for example be effected via a wireless data communication connection 20, for example via a WLAN connection, Bluetooth connection or mobile radio connection. Alternatively, the data communication connection 20 can be for example a wired data communication connection 20, for example a cable.

The output apparatus 18 that can be worn on the head can for example be an output apparatus 18 for augmented and/or virtual reality. If the gesture recognition and control device 10 is a component of the motor vehicle 12, then it is possible to use any output apparatus 18 known to a person skilled in the art, for example any known smartglasses.

Alternatively (not shown in FIGS. 1 to 5), the gesture recognition and control device 10 can be a component of the output apparatus 18. In this variant, the gesture recognition and control device 10 can be located for example on a lateral temple arm. For optionally detecting an operating gesture, the output apparatus 18 can include for example a camera at an end side.

Communication with a mobile terminal 22, for example a smartphone or a tablet PC, can likewise be effected via a wireless data communication connection 20, or by use of a wired data communication connection 20, for example a data bus of the motor vehicle 12 and/or a cable.

The mobile terminal 22 includes a display device 24, which can for example include a touch-sensitive screen. Via this example touch-sensitive screen, depending on the current graphical user interface, various operating functions of the mobile terminal 22 can be triggered, for example opening a program, switching to a navigation overview with small views of open programs, or for example accepting a telephone call or playing back a video, for example. In this case, the direct control of the display device 24 is undertaken by a control device 26, for example a control circuit board and/or an application program ("App") or an operating system. The control device 26 of the mobile terminal 22 can likewise include a processor device and/or a data memory, these components not being shown in FIG. 1 (and in the subsequent drawings) for reasons of better clarity.

FIG. 1 shows a display surface 28 of the output apparatus 18, which can ideally be situated in front of the user's eyes when the user has put the output apparatus 18 on.

Finally, FIG. 1 also shows an optional element, for example a camera, for example a time-of-flight camera, or an infrared sensor, which can be arranged for example on a roof lining of the motor vehicle or on a rear-view mirror of the motor vehicle. If the gesture recognition and control device 10 is a component of the output apparatus 18, for example, it can include a camera for example at an end side of the output apparatus 18.

For example, the gesture recognition and control device 10 can also include a plurality of such sensors 30.

The mobile terminal can be recognized (method operation S1) for example as soon as the mobile terminal 22 approaches the motor vehicle 12, for which purpose a Bluetooth LE receiver can be situated for example on an exterior of the motor vehicle 12. Alternatively, the mobile terminal 22 can be recognized (S1) if it is placed into a charging cradle in the motor vehicle 12, for example, wherein the mobile terminal 22 can be recognized (S1) by use of recognition techniques known to a person skilled in the art.

The mobile terminal 22 in the example in FIG. 1 may for example have just opened a user interface of a program for outputting information about the motor vehicle, for example current operating data. Alternatively, the example program may be some other application program, for example an application program for playing back films or a game, or a desktop of the mobile terminal 22 can be displayed.

The graphical user interface currently being displayed by the display device 24 of the known mobile terminal 22 can be ascertained (S2) by for example a corresponding output signal of the display device 24 being transmitted to the gesture recognition and control device 10, or by for example the gesture recognition and control device 10 interrogating the mobile terminal 22 in regard to what is currently being displayed.

For providing the output signal used for mirroring the graphical user interface of the mobile terminal 22 on the display surface 28 of the output apparatus 18 that can be worn on the head (S3), the output signal can be generated by the gesture recognition and control device 10, for example, or an output signal of the mobile terminal 22 can be forwarded to the output apparatus 18. In the latter example, the providing S3 also encompasses transmitting S4 the provided output signal to the example smartglasses.

The predefined output region 32 can be preset, for example, and, in the example in FIG. 1, can be for example a region above the passenger seat. In the example in FIG. 1, in this case a virtual image 34 of the graphical user interface of the mobile terminal 22 is shown in the output region 32. For example, in addition, a camera image of the interior of the motor vehicle can be displayed on the display surface 28, by virtue of the fact that the image 34 of the user interface of the mobile terminal 22 can be inserted. Alternatively, for example, a region of the display surface 28 on which the image 34 is not inserted can also be switched to be transparent, such that the user can see the real interior of the motor vehicle 12 through the example smartglasses. In a further variant, the output apparatus 18 can for example generate virtual reality that does not show an interior of the motor vehicle, but rather a landscape of a video game, for example, and insert the image 34 of the graphical user interface.

Techniques for determining whether or not the user has turned his/her head precisely toward the example predefined output region 32 are known to a person skilled in the art in the field of virtual reality and smartglasses.

The example in FIG. 1 shows a body part of the user, for example a hand 36, which is currently making a contactless operating gesture for controlling the mobile terminal 22. The contactless operating gesture, which can also be referred to as a spatial gesture, can be a pointing gesture, for example, in the case of which the user points in the air at the predefined output region 32 and thus at the image 34 of the user interface, and moves for example to where a function to be activated can be represented by an icon on the user interface shown in the image 34. For example, an operating region can be predefined, i.e. a region within which the user must make the spatial gesture in order that the latter is detected and/or recognized. The sensor 30 can then be directed for example at this example predefined operating region, or, alternatively, the sensor 30 or a plurality of sensors 30 can cover a large portion or the entire interior of the motor vehicle 12.

By way of example, a user interface can be displayed to the user, the user interface displaying various menu items, and/or for example values of various vehicle functions. If the user would then like to activate one of the possible operating functions displayed or for example acquire more detailed information concerning one of the vehicle functions, the spatial gesture can provide for example for the user to point with the finger at a corresponding icon or display element. After the optional process of detecting the contactless operating gesture by way of the sensor 30 (S5), a corresponding sensor signal can be received (S6) by the gesture recognition and control device 10 and the contactless operating gesture can be recognized for example for triggering a video playback function (S7).

Recognizing or tracking a body part by use of infrared sensors, for example, is known to a person skilled in the art as the so-called "leap motion" technique, for example. This technique can be implemented independently of whether the gesture recognition and control device 10 is a component of the motor vehicle 12.

For mirroring the graphical user interface or an excerpt therefrom, this can be mirrored for example by use of a "grabber", i.e. a so-called "content grabber" or "frame grabber", and be inserted into the virtual reality. Optionally, in addition to the inserted user interface, an image of the hand 36 can be inserted, for which purpose, according to a principle similar to the gesture recognition described above, the user's hand 36 can for example be filmed or tracked and then imaged onto the display surface 28 by the gesture recognition and control device 10.

By way of example, yet another display element 38 is shown on the display surface 28 of the output apparatus 18 in the example in FIG. 1, on which display element for example a further operating function can be displayed, for example a function for closing the gesture recognition and/or the mirroring of the graphical user interface and/or for menu navigation. Such an example "back button" can be represented for example in a predefined position, for example in an emphasized position.

In the example of FIG. 1, an optional development is shown, in addition, according to which the gesture recognition and control device 10 can provide (S8) a further output signal, which can describe the outputting of a further display content in the form of an image 40 of a further graphical user interface. This can for example involve an operating menu for the scaling and/or positioning of the first image 34, i.e. the first virtual graphical user interface, which is mirrored from the mobile terminal 22. If the user would like for example to have the image 34 appear not above the right passenger seat, but rather in front of the steering wheel, for example, the user can virtually shift the image 34 by use of a further contactless operating gesture, for example. After recognizing this further spatial gesture (S7), the gesture recognition and control device 10 can predefine (S8) the output region 32 on the basis of this further spatial gesture at a different position in the interior, i.e. in this case in front of the steering wheel.

Analogously thereto, a further spatial gesture can scale (S9) the image 34, that is to say that the image 34 can be "dragged" at the corners, for example, that is to say that the image 34 can be magnified, for example.

For controlling the mobile terminal 22, the gesture recognition and control device can generate a remote control signal (S10), which can activate for example the operating function for displaying the detailed information concerning an operating parameter or the playback of a video. The generated remote control signal is transmitted (S11) to the control device 26 of the recognized mobile terminal 22 via the data communication connection 20. The mobile terminal 22, for example the control device 26, then triggers the operating function (S12).

Optionally, the gesture recognition and control device 10 can be in communication with a motor vehicle system (not shown in FIG. 1), for example an ignition system or a driver assistance system, and the method can be activated on the basis of, for example, a signal describing that the motor vehicle is currently being operated in a piloted driving mode.

FIG. 2 to FIG. 5 show further example embodiments of the method and of the apparatuses, in each case only the differences with respect to the example in FIG. 1 being discussed below.

Figure 2:
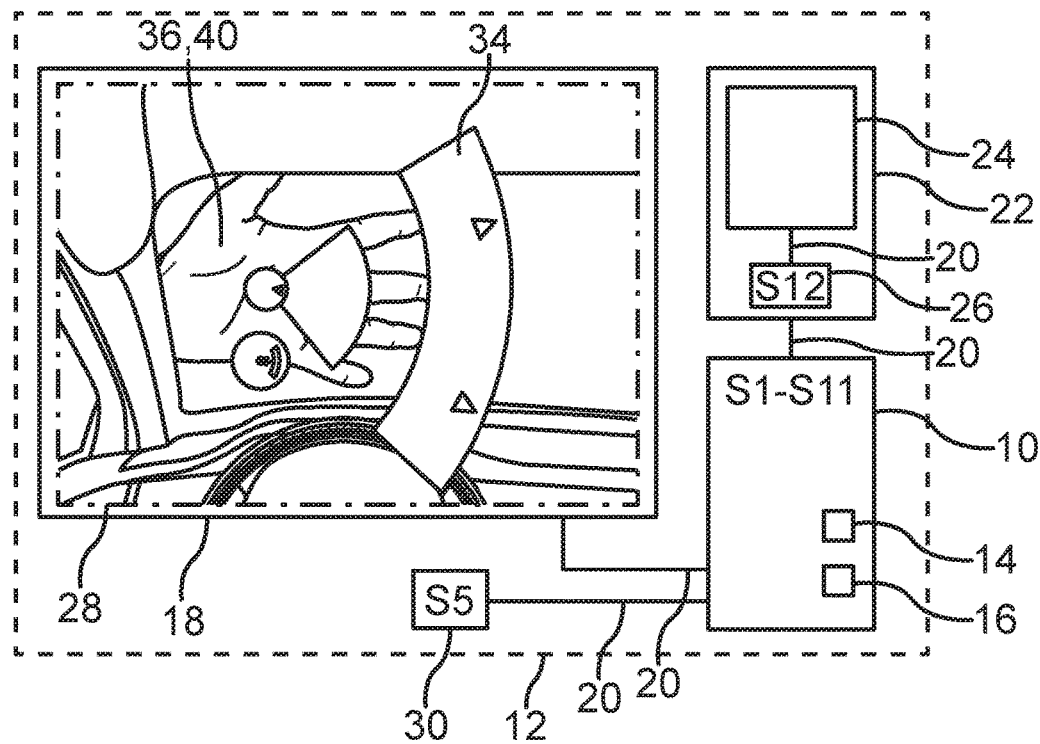
FIG. 2 is a schematic illustration concerning an example embodiment of the method described herein and of the apparatuses described herein.

In the example in FIG. 2, the image 34 of the graphical user interface of the mobile terminal 22 can represent for example an operating menu as a segment of an annulus. In this case, one or more operating functions can be selected depending on whether the hand 36 points into one region of the annulus portion in order to generate a display, for example, or into another region of the annulus portion in order to provide a new display, for example. The corresponding operating functions, for the purpose of better orientation, may be displayed on the graphical user interface mirrored on the display surface 28 of the output apparatus 18. FIG. 2 shows an example spatial gesture, in addition, in the case of which the hand 36 can be a spatial gesture with all the fingers being extended and with a palm of the hand facing upward, for example. This example spatial gesture can be for example a spatial gesture for navigating back to a home directory. Alternatively, the spatial gesture shown in FIG. 2 can describe for example pivoting of the outstretched hand toward the right or left, or upward or downward, in order to select the corresponding operating functions. As already explained above with regard to FIG. 1, either the real hand 36 of the user can be able to be seen in augmented reality, or an image of a virtual hand that moves just like the user's hand 36 is displayed.

The mirrored graphical user interface can represent a TV menu, for example, or a desktop of the mobile terminal 22 can be mirrored, or the graphical user interface can show a so-called "content streamer".

Figure 3:
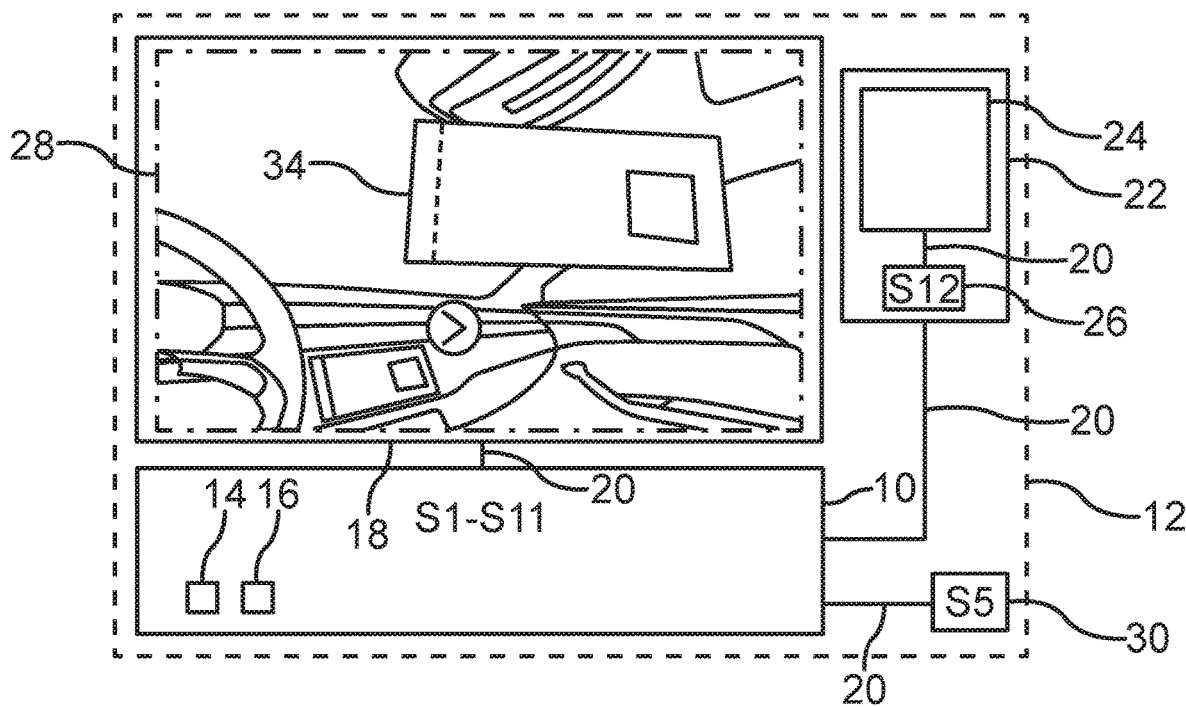
FIG. 3 is a schematic illustration concerning an example embodiment of the method described herein and of the apparatuses described herein.

The example in FIG. 3 shows a mirrored user interface that can be an operating menu of a media program, for example, with the aid of which it is possible for example to select and listen to music albums or to switch to a video and photograph function, for example.

Figure 4:
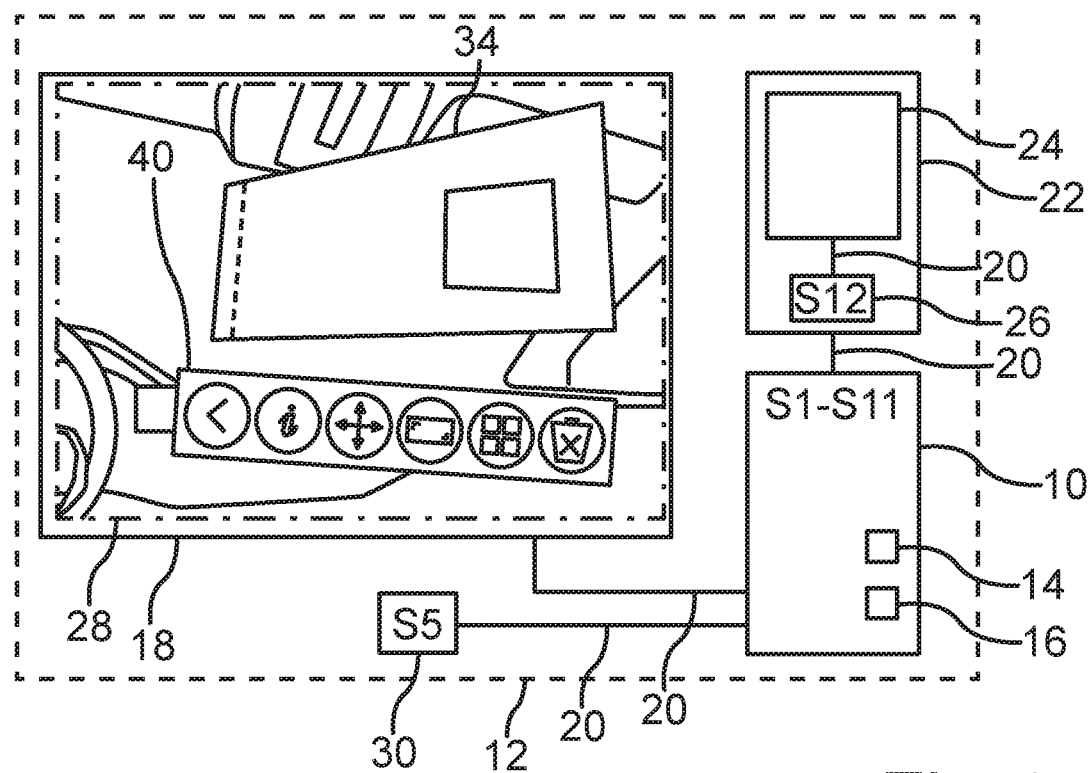
FIG. 4 is a further schematic illustration concerning the example embodiment from FIG. 3.

FIG. 4 shows an extension of the example embodiment from FIG. 3, wherein a further graphical user interface, either another one from the mobile terminal 22 or a graphical user interface generated especially by the gesture recognition and control device 10, can additionally be displayed by the image 40. With the aid of this further, example operating menu, for example a music album stored in the mobile terminal 22 can be deleted, for example different tracks or functions can be chosen, or the image 34 can be scaled and/or positioned by using this additional menu (S8, S9).

Figure 5:
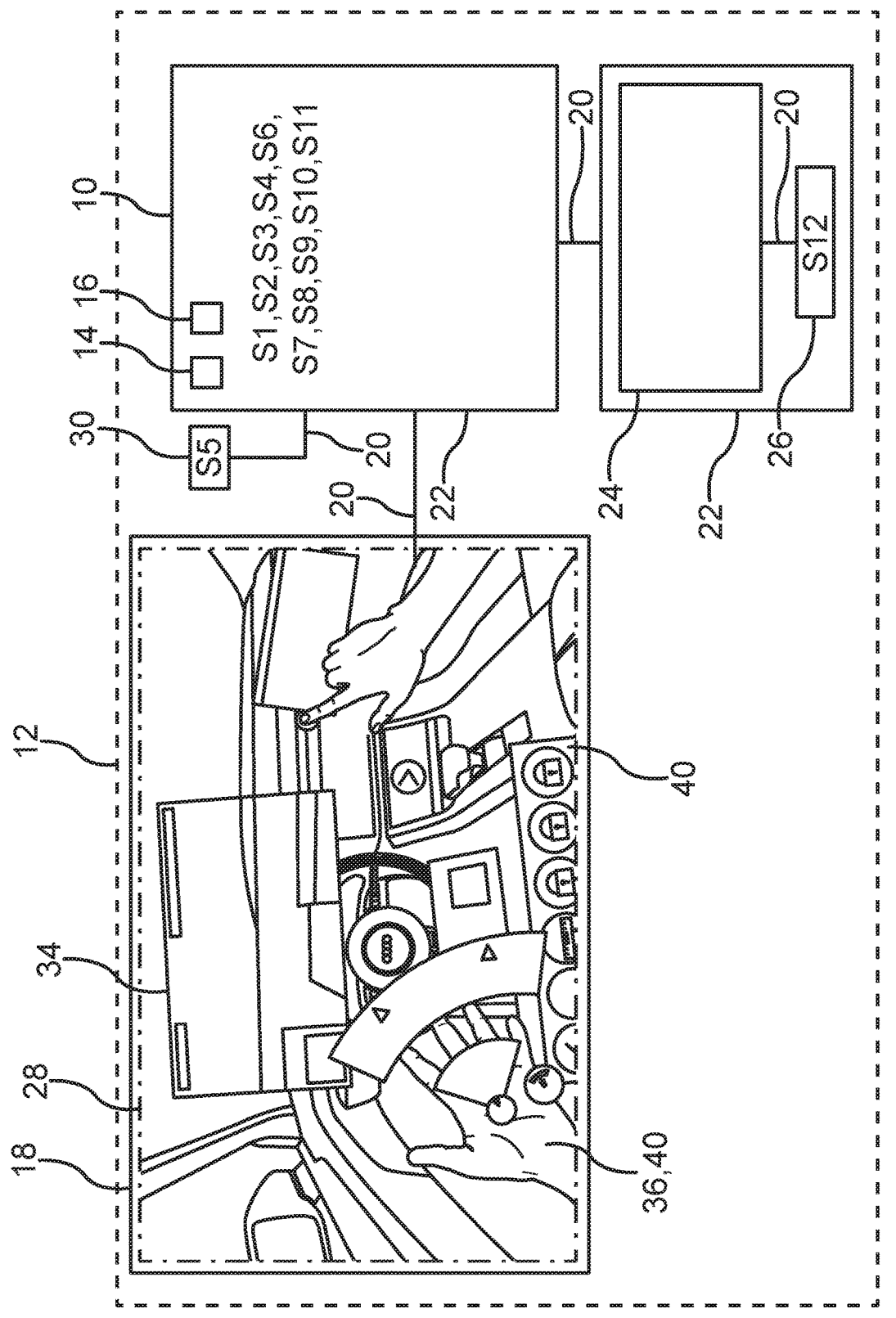
FIG. 5 is a schematic illustration concerning an example embodiment of the method described herein and of the apparatuses described herein.

FIG. 5 shows an example embodiment in which the user, for example a driver during fully autonomous travel (level 5), or a front passenger or a passenger at the back, can generate an arbitrary display, scale (S9) it and/or position it in the interior (i.e. predefine S8 the output region 32), in order for example to watch a soccer match live. On a further image 40, that is to say a further display, which the user can generate, scale (S9) and/or position as required, the user can for example represent the operating concept of his/her HMI and operate his/her mobile terminal 22 and/or the motor vehicle 10, or the user can for example cause combined contents to be displayed, such as, for example, a speed, navigation information (for example distance remaining and/or arrival time). A further image 40 or display element, i.e. a further display, can possibly be used by the user alongside so as to allow the user to deal with his/her emails, for example. In other words, the user can configure his/her display and operating surfaces himself/herself in his/her virtual environment.

This system can be combined well with an entertainment system that provides virtual reality. During the example game, the user would therefore not have to exit virtual reality in order to be able to view his/her secondary activities, for example retrieving emails, or to operate his/her motor vehicle 12.

Overall, the examples show how VR and/or AR-based remote operation may be made possible by the methods and apparatuses described herein.

In accordance with a further example embodiment, within virtual reality, for example, the user, regardless of from what context (for example gaming and/or meeting), can activate for example a "flying HMI" or "VR HMI"—i.e. the mirrored, virtual user interface. This can offer the same functionality as a serial HMI. In this case, the serial HMI and the VR HMI can always be synchronized and show the same display contents. For example, analogously to serial operation (for example touch, slide, pinch), the VR HMI can likewise be able to be operated as usual by use of analogous gestures. Moreover, for example, the user can position the VR HMI, i.e. the mirrored graphical user interface, at an expedient location for the user, i.e. can predefine the output region 32. The system can be implemented very easily both in VR and in AR (augmented reality).

In accordance with a further example embodiment, a technical implementation can provide that by tracking for example the hands 36 or one hand 36 of the user by using one or more sensors 30, for example infrared sensors, for example using leap motion, and by determining the hand coordinates in relation to the coordinates of the output apparatus 18, i.e. of the HMD, the action space of the user can be detected completely in three dimensions. The represented image in the serial HMI, i.e. of the image represented by the display device 24 of the mobile terminal 22, can for example be streamed by use of grabbers into the "area of interest", i.e. into the output region 32, with the other region freely defined by the user within virtual reality. Actions by a third person on the serial HMI, i.e. for example on the screen of the mobile terminal 22, can therefore be represented in real time in the VR HMI, i.e. in the image 34 of the mirrored user interface. During operation of the corresponding operating function in the VR HMI, the corresponding message can be communicated to a main unit, for example, which performs the actions.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in *Superguide v. DIRECTV*, 358 F3d 870, 69 USPQ2d 1865 (Fed. Cir. 2004). That is the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C. In addition, the term "and/or" includes a plurality of combinations of relevant items or any one item among a plurality of relevant items. That is, the scope of the expression or phrase "A and/or B" includes all of the following: (1) the item "A", (2) the item "B", and (3) the combination of items "A and B".

The invention claimed is:

1. A method for operating a mobile terminal using a gesture recognition and control device, the method comprising:

recognizing the mobile terminal;

ascertaining a graphical user interface as a GUI of the mobile terminal generated to be displayed by a display device of the mobile terminal, the GUI providing an operating option that involves an operating function of the mobile terminal being triggerable;

providing an output signal describing the GUI of the mobile terminal as a display content of the mobile terminal;

mirroring the display content of the mobile terminal in form of a virtual display content of the mobile terminal in an output region in an interior of a motor vehicle as part of an augmented reality or a virtual reality, output by a wearable output apparatus, based on the output signal describing the GUI of the mobile terminal as the display content of the mobile terminal;

while the virtual display content of the mobile terminal is mirrored in the output region, recognizing a contactless operating gesture of a user based on the operating option of the GUI of the mobile terminal;

generating a remote control signal based on the contactless operating gesture, the remote control signal describing triggering of the operating function of the mobile terminal assigned to the contactless operating gesture; and transmitting the remote control signal to a control device of the mobile terminal for triggering the operating function of the mobile terminal.

2. The method as claimed in claim 1, further comprising:

recognizing a further contactless operating gesture to predefine a positioning of the virtual display content in the interior; and predefining the output region in the interior based on the further contactless operating gesture.

3. The method as claimed in claim 2, further comprising:

providing a further output signal describing a further graphical user interface as a further GUI providing an operating menu for predefining the positioning of the virtual display content.

4. The method as claimed in claim 1, further comprising:

recognizing a further contactless operating gesture describing a scaling of the virtual display content; and scaling an image showing the virtual display content based on the further contactless operating gesture.

5. The method as claimed in claim 4, further comprising:
providing a further output signal describing a further graphical user interface as a further GUI providing an operating menu for scaling the virtual display content.

6. The method as claimed in claim 1, wherein the method is performed by the gesture recognition and control device based on at least one of an activation of a fully autonomous driving mode and a start signal of the motor vehicle.

7. A gesture recognition and control device, comprising:
a memory configured to store instructions; and
a processor configured to execute the instructions stored in the memory to:
  recognize a mobile terminal,
  ascertain a graphical user interface as a GUI of the mobile terminal generated to be displayed by a display device of the mobile terminal, the GUI providing an operating option that involves an operating function of the mobile terminal being triggerable,
  provide an output signal describing the GUI of the mobile terminal as a display content of the mobile terminal,
  mirroring the display content of the mobile terminal in form of a virtual display content of the mobile terminal in an output region in an interior of a motor vehicle as part of an augmented reality or a virtual reality, output by a wearable output apparatus, based on the output signal describing the GUI of the mobile terminal as the display content of the mobile terminal,
  while the virtual display content of the mobile terminal is mirrored in the output region, recognize a contactless operating gesture of a user based on the operating option of the GUI of the mobile terminal,
  generate a remote control signal based on the contactless operating gesture, the remote control signal describing triggering of the operating function of the mobile terminal assigned to the contactless operating gesture, and
  transmit the remote control signal to a control device of the mobile terminal to trigger the operating function of the mobile terminal.

8. The gesture recognition and control device as claimed in claim 7, wherein the processor is configured to execute the instructions stored in the memory to:
  recognize a further contactless operating gesture to predefine a positioning of the virtual display content in the interior,
  predefine the output region in the interior based on the further contactless operating gesture.

9. The gesture recognition and control device as claimed in claim 8, wherein the processor is configured to execute the instructions stored in the memory to:
  provide a further output signal describing a further graphical user interface as a further GUI providing an operating menu for predefining the positioning of the virtual display content.

10. The gesture recognition and control device as claimed in claim 7, wherein the processor is configured to execute the instructions stored in the memory to:
  recognize a further contactless operating gesture describing a scaling of the virtual display content, and
  scale an image showing the virtual display content based on the further contactless operating gesture.

11. The gesture recognition and control device as claimed in claim 10, wherein the processor is configured to execute the instructions stored in the memory to:
  provide a further output signal describing a further graphical user interface as a further GUI providing an operating menu for scaling the virtual display content.

12. The gesture recognition and control device as claimed in claim 7, wherein the processor is configured to execute the instructions stored in the memory to recognize the mobile terminal based on at least one of an activation of a fully autonomous driving mode and a start signal of the motor vehicle.

13. A motor vehicle comprising the gesture recognition and control device claimed in claim 7.

14. An output apparatus wearable on a head of a user for outputting augmented reality and/or virtual reality, the output apparatus comprising:
a display; and
a gesture recognition and control device, including:
  a memory configured to store instructions, and
  a processor configured to execute the instructions stored in the memory to:
    recognize a mobile terminal,
    ascertain a graphical user interface as a GUI of the mobile terminal generated to be displayed by a display device of the mobile terminal, the GUI providing an operating option that involves an operating function of the mobile terminal being triggerable,
    generate an output signal describing the GUI of mobile terminal as a display content of the mobile terminal,
    mirror the display content of the mobile terminal in form of a virtual display content of the mobile terminal in an output region in an interior of a motor vehicle as part of an augmented reality or a virtual reality, output by the output apparatus, based on the output signal describing the GUI of the mobile terminal as the display content of the mobile terminal,
    while the virtual display content of the mobile terminal is mirrored in the output region, recognize a contactless operating gesture of user based on the operating option of the GUI of the mobile terminal,
    generate a remote control signal based on the contactless operating gesture, the remote control signal describing triggering of the operating function of the mobile terminal assigned to the contactless operating gesture, and
    transmit the remote control signal to a control device of the mobile terminal to trigger the operating function of the mobile terminal.

15. The output apparatus as claimed in claim 14, further comprising a camera to detect the contactless operating gesture of the user.

* * * * *